Sept. 26, 1933.  F. W. QUICK  1,927,993
BRAKE FOR VEHICLES
Filed April 7, 1932
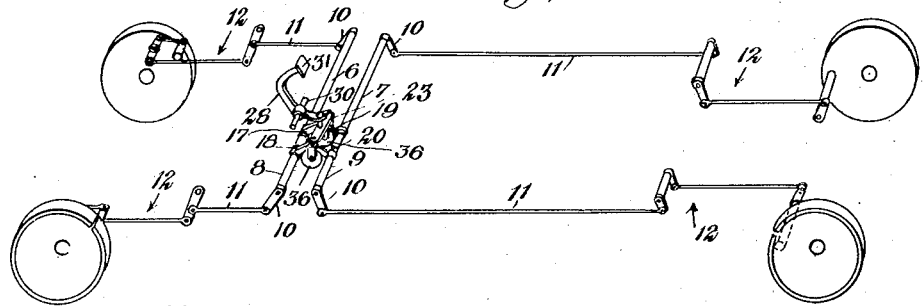
Fig. 1.
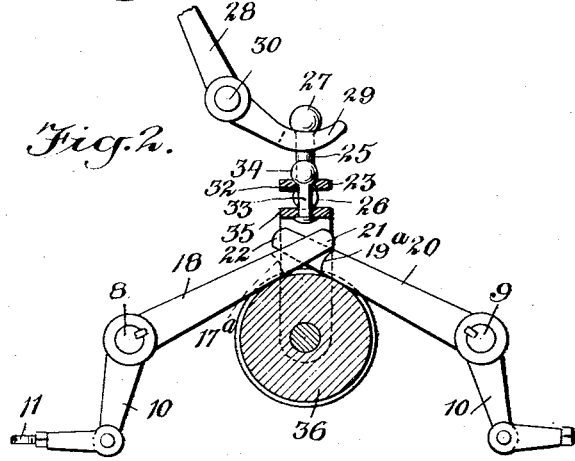
Fig. 2.
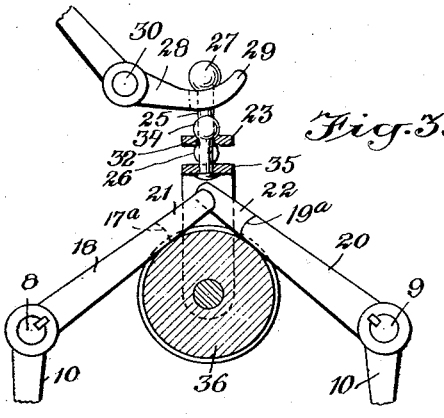
Fig. 3.
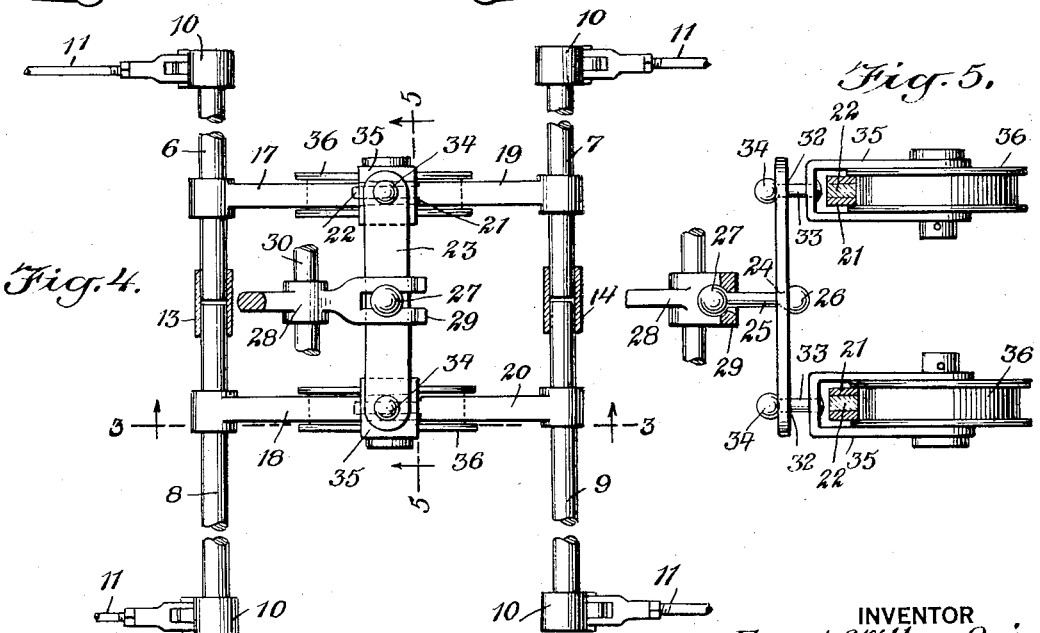
Fig. 4.
Fig. 5.
WITNESSES
INVENTOR
Frank Wilbur Quick
BY
ATTORNEYS Patented Sept. 26, 1933

1,927,993

UNITED STATES PATENT OFFICE 1,927,993

BRAKE FOR VEHICLES

Frank Wilbur Quick, New York, N. Y.

Application April 7, 1932. Serial No. 603,863

18 Claims. (Cl. 188—204)

An object of the invention is to provide a brake for automotive and other vehicles which will exert an equal braking effect at the several wheels.

Another object of the invention is to provide a floating means which engages members operating the brakes at the several wheels when the floating means is moved by its support.

Still another object of the invention is to provide a floating means which serves as a wedge and engages at its opposite sides levers operatively connected with the brakes.

The invention also comprehends a floating means centrally supported and which has annular guideways engaged by levers operatively connected with the brakes.

Additional objects of the invention will appear in the following specification in which the preferred form of the invention is described.

In the drawing similar reference characters refer to similar parts in all the views, of which Figure 1 is a perspective diagrammatic view illustrating the means for operatively connecting the brake with the wheels, Figure 2 is an enlarged cross sectional view of the subject matter of this application, Figure 3 is a sectional view on the line 3—3 of Figure 4, and similar to the view illustrated in Figure 2, but in Figure 3 the floating wedge means has been raised to operative position, Figure 4 is a plan view of the braking means shown in Figures 2 and 3, and Figure 5 is a sectional view on the line 5—5 of Figure 4.

By referring to the drawing it will be seen that shafts 6, 7, 8 and 9 are connected by arms 10 and links 11 with any standard braking means 12. The shafts 6 and 8 are connected by a bearing 13 and the shafts 7 and 9 are connected by a bearing 14. An arm 17 is secured to the shaft 6, an arm 18 is secured to the shaft 8, an arm 19 is secured to the shaft 7 and an arm 20 is secured to the shaft 9. As will best be seen by referring to Figures 3 and 5, the arms 17 and 18 have bifurcated ends 21 and each of the shafts 19 and 20 has a tongue 22 which is embraced between the bifurcated ends 21 of the shafts 17 and 18 respectively. The arms 17 and 18 have shoulders 17ᵃ against which the tongues 22 rest when the brakes are not operated and the arms 19 and 20 have shoulders 19ᵃ against which the bifurcated ends 21 rest when the brakes are not operated.

As will best be seen by referring to Figure 4, a transverse member 23 is provided which has an aperture 24 in which is disposed a stud 25, the stud 25 having a ball 26 engaging the underside of the transverse member 23 at its aperture 24, the stud 25 also having at its other end a ball 27, an operating lever 28 being provided which has a bifurcated end 29 for embracing the stud 25 below the ball 27. The lever 28 is pivoted at 30 and may be operated by any suitable means, such as the pedal 31. The transverse member 23 has two apertures 32, the apertures 32 being disposed one at each end of the transverse member 23 and in each of these apertures 32 there is disposed a stud 33 having a ball 34 engaging the top of the transverse member 23, each of the studs 33 being secured by any suitable means to a bracket 35. There is mounted in each of the brackets 35 an annular member 36 having a guideway. Preferably the annular wedge guideways 36 are rotatably mounted in the brackets 35. As will best be seen by referring to Figures 2 and 3, the arms 17 and 19 of one pair are disposed in the guideway in one of the members 36 and the other pair of arms 18 and 20 are disposed in the guideway in the other member 36. The bifurcated arms 21 of the arms 17 and 18 are disposed above the annular wedge guideways 36, and the tongues 22 of the arms 19 and 20 are embraced between the bifurcated arms 21 of the arms 17 and 18 respectively above the annular members 36.

It will be understood from the above that, when the lever 28 is operated, it will move the transverse member 23 upwardly, but that the said transverse member 23 may rotate relatively to the lever 28 and that it may also tilt transversely relatively to the lever 28.

It will, therefore, be seen that a universal joint is provided between the transverse member 23 and the lever 28. It will also be seen that the brackets 35 may rotate relatively to the transverse member 23 and that the said brackets 35 may also tilt laterally or longitudinally of the vehicle relatively to the transverse member 23. Therefore, when the lever 28 is operated to raise the transverse member 23, the pressure will be equalized at each of the arms 17, 18, 19 and 20 for, when the movement of one of the said arms is delayed, the transverse member 23 and the brackets 35 will adjust themselves to distribute the pressure at the other arms to equalize the pressure at the several arms. When the resistance to the movement is greater at the arms 17 and 19 than at the arms 18 and 20, the transverse member 23 will be tilted so that, at the arms 18 and 20, it will move upwardly relatively to the end of the transverse member at the arms 17 and 19. It will also be seen that, should the resistance at the arm 17 be greater than at the arm 19, the transverse member 23 may rotate on the stud 25 to move the end of the transverse member 23 at the arms 17 and 19 away from the arm 17 and in the direction of the arm 19. It will also be understood that where the resistance to the movement is greater at the arms 17 and 18 than at the arms 19 and 20, the transverse member 23 may move in the direction of the arms 19 and 20 to equalize the pressure.

From the above it will be understood that the pressure exerted at the arms 17, 18, 19 and 20 will be equalized in all cases to operate the brakes evenly at the several wheels.

What is claimed is:

1. In a brake for vehicles, a floating means, means centrally connected with the floating means, arms engaging opposite sides of the ends of the floating means and free therefrom, the arms being connected with braking means, and means for moving the second mentioned means for exerting pressure on the arms.

2. In a brake for vehicles, a floating means having guideways spaced apart, means connected with the floating means between the guideways, arms at opposite sides of the floating means, the arms engaging the guideways and being connected with braking means, and means for moving the second mentioned means for exerting pressure on the arms.

3. In a brake for vehicles, two converging arms, two additional converging arms spaced from the first mentioned arms, the arms being connected with braking means, a floating means disposed between the said arms for exerting equal pressure on each arm under all conditions, and means to move the floating means relatively to the arms.

4. In a brake for vehicles, two converging arms, two additional converging arms spaced from the first mentioned arms, the arms being connected with braking means, a floating means disposed between the said arms for exerting equal pressure on each arm under all conditions, a stud secured to the floating means between the first mentioned and second mentioned arms, the stud having an enlargement, and a lever having a fork embracing the stud and disposed for engaging the enlargement thereon for moving the floating means relatively to the arms.

5. In a brake for vehicles, two converging arms, two additional converging arms spaced from the first mentioned arms, the arms being connected with braking means, a floating means disposed between the said arms for exerting an equal pressure on each arm under all conditions, and means engaging the floating means between the first mentioned and second mentioned arms for moving the floating means relatively to the arms.

6. In a brake for vehicles, two converging arms, two additional converging arms, the arms being connected with braking means, and a floating member movable on axes at angles to each other for pressing evenly against the several arms.

7. In a brake for vehicles, a member having diverging sides, two arms having ends converging in the opposite direction and engaging the sides diverging in one direction of the member respectively, and means to move the member in one direction against the arms, the member being free to move in another direction relatively to the arms during its movement in the first mentioned direction.

8. In a brake for vehicles, a means having diverging sides, two arms engaging diverging sides of the means respectively, two additional arms spaced from the first mentioned arms and engaging diverging sides of the said means respectively, and means to move the first mentioned means in one direction against the arms, the first mentioned means being free to move in other directions relatively to the arms during its movement in the first mentioned direction.

9. In a brake for vehicles, a floating means having two guideways spaced apart, with each guideway having diverging portions, arms connected with braking means and disposed at opposite sides of the floating means and engaging the guideways, and means to move the floating means in one direction against the arms, the floating means being free to move in other directions relatively to the arms during its movement in the first mentioned direction.

10. In a brake for vehicles, a floating means having two annular guideways spaced apart, arms connected with braking means and disposed at opposite sides of the floating means and engaging the guideways, and means to move the floating means in one direction against the arms, the floating means being free to move in other directions relatively to the arms during its movement in the first mentioned direction.

11. In a brake for vehicles, a floating means having two guideways spaced apart, with each guideway having diverging portions, arms connected with braking means and disposed at opposite sides of the floating means and engaging the guideways, and supporting means for the floating means which permits lateral movement of the floating means relatively to the supporting means.

12. In a brake for vehicles, a floating means having two guideways spaced apart, with each guideway having diverging portions, arms connected with braking means and disposed at opposite sides of the floating means and engaging the guideways, a stud secured to the floating means and provided with a head, and a forked arm engaging the head adjacent the stud.

13. In a brake for vehicles, a floating means including a member and two wedge guideways spaced apart and secured to the member, two pairs of arms, the arms in each pair engaging opposite sides of a wedge guideway respectively, and operative means connected with the member between the wedge guideways.

14. In a brake for vehicles, a floating means including a member and two wedge guideways articulated thereto, two pairs of arms, the arms in each pair engaging opposite sides of a wedge guideway respectively, and operative means articulated to the member between the wedge guideways.

15. In a brake for vehicles, a floating means including a member and two wedge guideways spaced apart and secured to the member, two pairs of arms, the arms in each pair engaging opposite sides of a wedge guideway respectively, and with an arm in each pair having a slot adjacent the wedge guideway in which the companion arm is disposed.

16. In a brake for vehicles, a floating means including a member, two brackets spaced apart and secured to the member, and two wedge guideways, one mounted in each of the brackets; two pairs of arms, the arms in each pair engaging opposite sides of a wedge guideway respectively, and means connected with the member between the wedge guideways for operative purposes.

17. In a brake for vehicles, a floating means including a member, two brackets spaced apart and articulated to the member, and two wedge guideways, one mounted in each of the brackets; two pairs of arms, the arms in each pair engaging opposite sides of a wedge guideway respectively, and means connected with the member between the wedge guideways for operative purposes.

18. In a brake for vehicles, a floating means including a member, two brackets spaced apart and secured to the member and two annular guideways, one rotatably mounted in each bracket, two pairs of arms, the arms in each pair engaging opposite sides of a wedge guideway respectively, and means connected with the member between the wedge guideways for operative purposes.

FRANK WILBUR QUICK.